Oct. 14, 1941.  H. W. PRICE  2,258,908
TRANSMISSION CONTROL
Filed Oct. 28, 1938  3 Sheets-Sheet 1
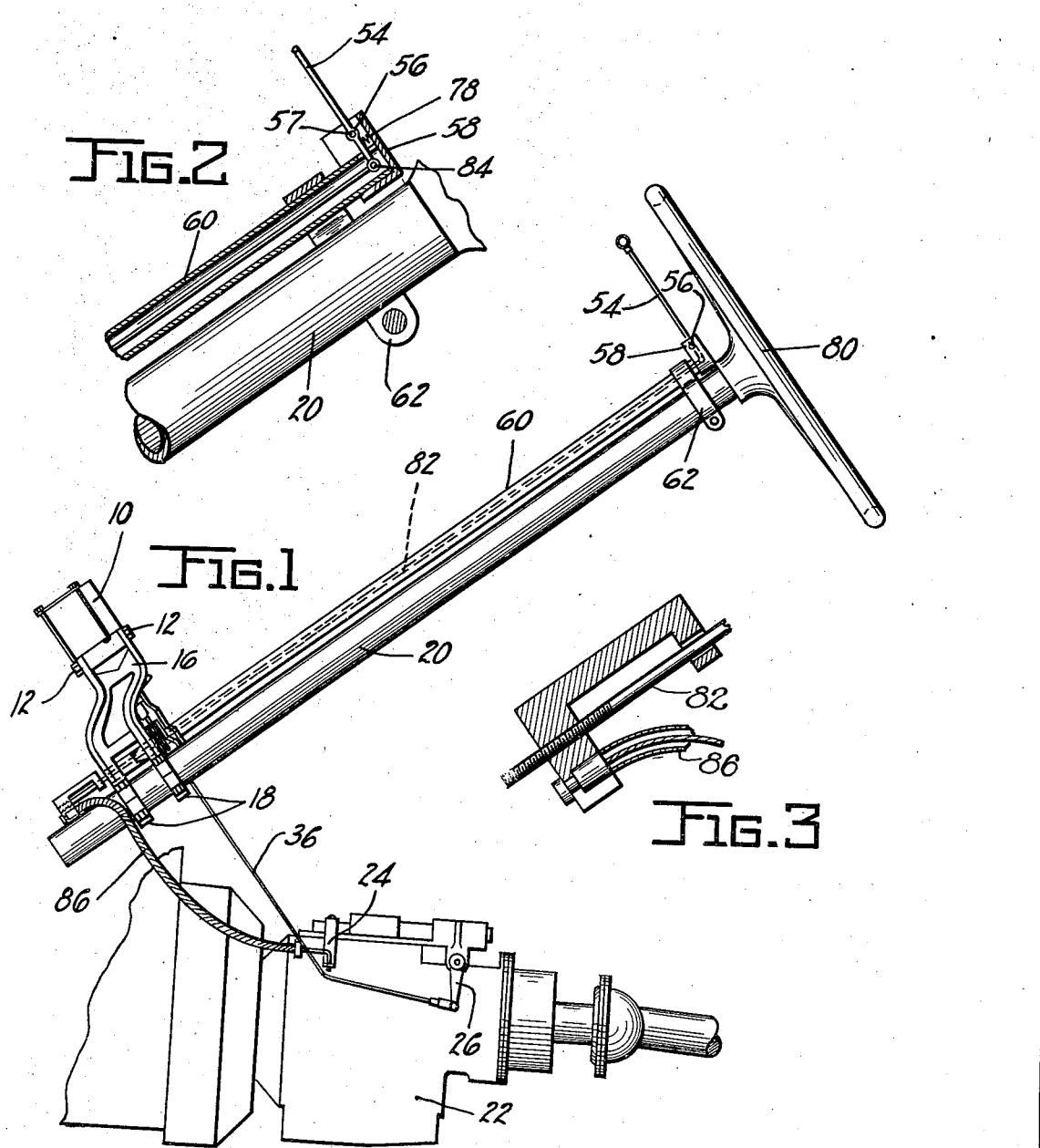
INVENTOR.
HAROLD W. PRICE
BY
ATTORNEY.

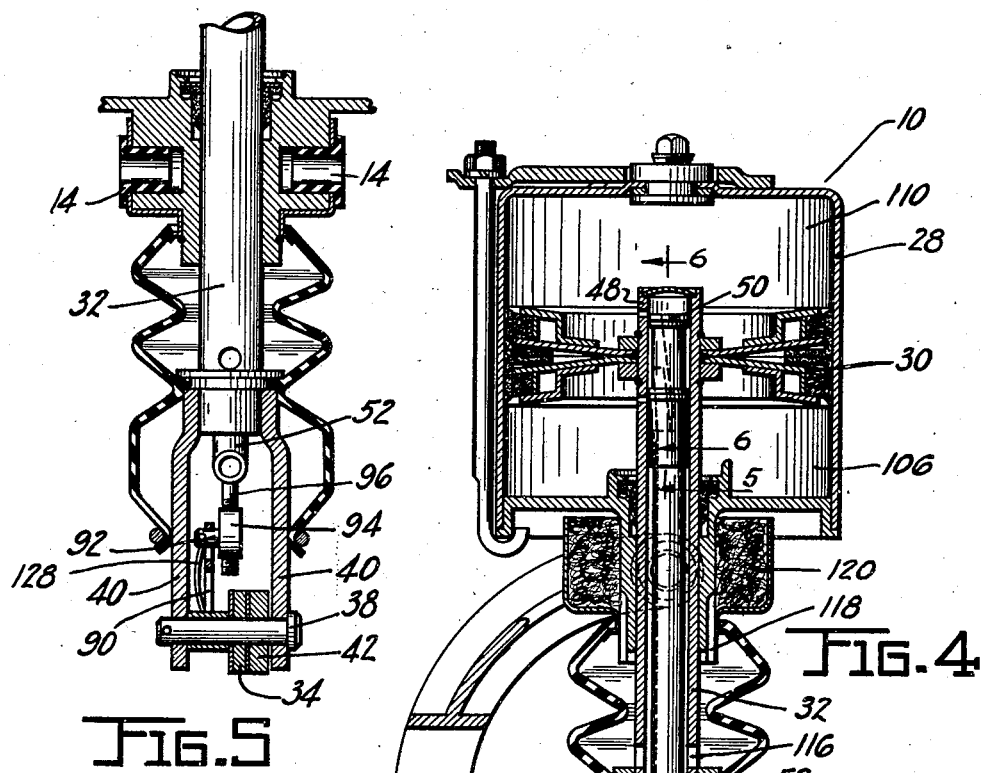

Oct. 14, 1941.   H. W. PRICE   2,258,908
TRANSMISSION CONTROL
Filed Oct. 28, 1938   3 Sheets-Sheet 3
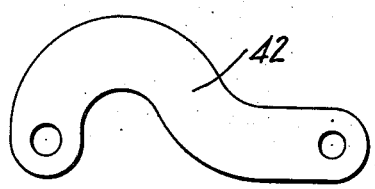
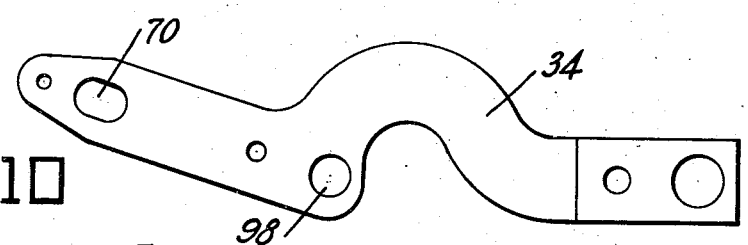
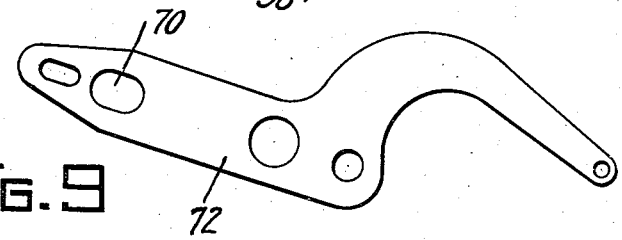
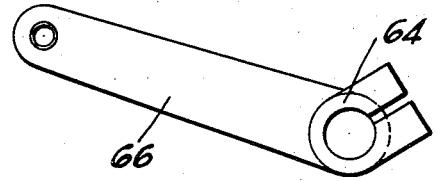
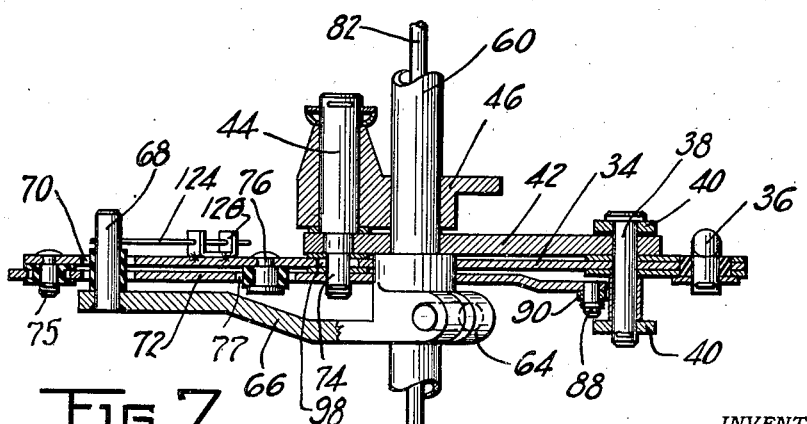
INVENTOR.
HAROLD W. PRICE
BY
ATTORNEY.

Patented Oct. 14, 1941

2,258,908

UNITED STATES PATENT OFFICE 2,258,908

TRANSMISSION CONTROL

Harold W. Price, South Bend, Ind., assignor to Bendix Aviation Corporation, South Bend, Ind., a corporation of Delaware Application October 28, 1938, Serial No. 237,458

6 Claims. (Cl. 74—335)

This invention relates to transmission operating means, and more particularly to means for operating the change-speed transmission of an automotive vehicle.

One of the objections to the mechanism for operating the three-speeds forward and reverse transmission of the day is the length of movement required of the gear shift lever, or, if the movement is small, the relatively large force required to move said lever. It is also to be noted that the present day gear shift lever constitutes an obstruction in the driver's compartment and prevents complete freedom of movement of the driver and other occupants.

It is therefore one of the objects of the present invention to provide a transmission gear control mechanism so constituted as to avoid the above-referred-to difficulties.

Another object is to provide, in a transmission gearing controlling mechanism having gears shiftable by power, a manually operable pivotally mounted controlling device located adjacent the operator, i. e., beneath the steering wheel or on the dashboard, and movable in a manner simulating the movement of a conventional gear shift lever for controlling the shiftable gears.

A further object is to provide, in a manually controlled power operated gear shifting mechanism, a novel control apparatus therefor including an arrangement insuring that the extent of movement of the gear shifting member will be substantially proportional to the extent of movement of the control member, whereby an exceedingly accurate control may be exercised by the operator over the shifting of the gears. Such a mechanism is known in the art as a follow-up control, and in the embodiment of my invention selected for illustration there is disclosed an air-suspended motor operably connected to the transmission and controlled by a so-called line type of follow-up valve.

A still further object of the invention is to provide a fluid pressure operated power gear shifting mechanism having a manually operable control member and means controlled thereby in such a manner that the movements of such control member to effect a shifting of the transmission gears will be resisted by a force substantially proportional to the force exerted by the transmission operating power means, whereby a "feel" or reaction to shifting will be experienced by the operator in a manner simulating the reaction encountered in manually shifting transmission gears in the conventional manner.

Yet another object of the invention is to provide a simple and compact mechanism for operating an automotive transmission, said mechanism consisting of relatively few parts which may be quickly applied to the transmission of a used automotive vehicle or applied to the transmission during the assembly of a new automotive vehicle.

The principal object of my invention, however, is to provide, in a transmission operating mechanism having the above-described features, a follow-up valve mechanism and operating linkage therefor for so controlling the transmission operating motor as to effect a variable rate of movement of the power element thereof as it is moved to place the gears in mesh. With such a mechanism, the rate of movement of the power element and its connected shift rail progressively decreases, that is decelerates, and the load exerted by the motor to move the rail changes as the gears approach their meshed position.

Yet another object of the invention is to provide a valve mechanism for so controlling the shift rail operating motor that the power element of the motor decelerates as it moves from its transmission neutral position to establish the transmission in gear, and, when said element reaches or is just about to reach the end of its stroke, the valve mechanism functions to then and there terminate the operation of the power means.

Other objects of the invention and desirable details of construction and combinations of parts will become apparent from the following description of a preferred embodiment, which description is taken in conjunction with the accompanying drawings, in which:

Figure 1 is a view disclosing, in side elevation, the transmission operating mechanism constituting my invention;

Figure 2 discloses, in section, the manually operated selector for controlling the transmission operating mechanism;

Figure 3 is a fragmentary sectional view of a portion of the manually operated mechanism for effecting the cross-shift operation of the transmission;

Figure 4 is a view, partly in section and taken on the line 4—4 of Figure 1, disclosing the details of the shift rail operating motor and the valve operating linkage;

Figures 5 and 6 are sectional views, taken on the lines 5—5 and 6—6 respectively of Figure 4, disclosing details of the valve mechanism and motor;

Figure 7 is a sectional view, taken on the line

7—7 of Figure 4, disclosing details of valve operating linkage; and

Figures 8, 9, 10 and 11 are views disclosing the several parts of the valve operating linkage of Figure 6.

In that embodiment of my invention disclosed in the drawings, a double-ended double-acting pressure differential operated motor 10 is pivotally mounted, by trunnion pins 12 in bushings 14, to a curved bracket 16, the latter being detachably mounted, by a clamp 18, to the steering column 20 of the vehicle. With such a mounting, the motor, which extends perpendicular or substantially perpendicular to the steering column, may be angularly moved about the column to the desired position.

The change-speed transmission 22 to be operated includes the usual shift rails, means operated by a crank 24 for selecting one of the rails to be operated, and other means operated by a crank 26 for moving the selected rail to establish the transmission in gear. Inasmuch as this transmission is now standard equipment in many of the vehicles of the day, it is believed unnecessary to disclose it in detail.

My invention is directed to the means for controlling the transmission operating motor 10, and particularly to the construction and arrangement of the linkage for operating the valve mechanism within the motor.

Referring now to Figure 4, disclosing the principal elements of my invention, the aforementioned motor includes a casing 28 which houses a reciprocable piston 30. This piston, oftentimes called the power element of the motor, is operably connected to the aforementioned shift rail operating crank 26 by a hollow connecting rod 32, a floating valve-operating power lever 34 and a link 36. As disclosed in Figure 7, the power lever is pivotally connected, by a pin 38, to parallel members 40 secured to the lower end of the connecting rod, and said lever is also connected at its end to the hook-shaped end of the link 36. The pin 38 also extends through one end of an angularly movable support link 42, which is pivotally mounted at its other end upon a pin 44 mounted in and extending from a support 46 secured to the bracket 16.

The valve mechanism for controlling the operation of the motor includes two major parts, one of the parts constituting the end portion 48 of the connecting rod 32 and the other part constituting a spool-shaped member 50 reciprocable within end portion 48 and mounted on the end of a tube 52 connected to the intake manifold of the engine of the vehicle, or other source of vacuum. No claim is made to this valve mechanism in the instant application, inasmuch as it is disclosed, described and claimed in my application Serial No. 230,996, filed September 21, 1938.

The tube 52 is moved to open the valve by means of a selector 54 pivotally mounted at 56 upon a pin 57 extending through a cup-shaped member 58 secured to the upper end of a tubular member 60. The latter member is secured at one of its ends to the steering column by a bracket 62 and extends at its other end through openings in the base of the bracket 16. To the lower end of the tubular member 60 there is secured, by a split boss 64, a crank 66 having a pin 68 at its end extending through an elliptically-shaped opening 70 in one end of a manually operated valve operating lever 72. The lever 72 is pivotally mounted upon the end portion 74 of the pin 44 and is pivotally connected, at one of its ends, to the lever 34 by a pin 75. The levers 34 and 72 and the support link 42 are curved, as disclosed in Figures 9, 10 and 11, to fit about the boss 64 and tube 60. There is thus provided a compact linkage, the arms of the levers extending across both the tubular member 60 and the steering post 20.

Describing now the operation of the transmission operating mechanism constituting my invention, and incidentally describing the mechanism for selecting the shift rail to be operated, when it is desired to place the transmission in low gear, the selector 54 is rotated counterclockwise against the tension of a spring 78 in a plane perpendicular to the plane of a steering wheel 80. It may be noted here that the selector 54 and its housing 58 are moved 90° out of position in Figures 1 and 2 for the purpose of illustration. With this movement of the selector, a rod 82 pivotally connected thereto at 84 and extending through the tube 60 is moved downwardly to rotate the crank 24, the latter being connected to the rod by means of a Bowden wire connection 86.

The low and reverse shift rail of the transmission having now been selected for operation, the selector is rotated clockwise, thereby rotating the tube 60 clockwise about its longitudinal axis. Referring to Figures 4 and 7, it will be noted that this movement of the tube effects a clockwise movement of the crank 66, and accordingly a clockwise movement of the valve operating lever 72 about its fixed pivot 74. As disclosed in Figures 4, 5 and 7, to the upper end of the latter lever there is pivotally connected, by a pin 88, a short link 90, and this link at its other end is pivotally connected, by a pin 92, to a sleeve 94 threadedly mounted on a pin 96 extending from and secured to the valve operating tube 52.

As stated above, when the crank 66 is rotated to move the valve operating lever 72 clockwise, the so-called power lever 34 is also moved clockwise about the hooked-shaped end of the link 36, the so-called drift-lock mechanism of the transmission including detents serving at the time to resist movement of the latter pivot. This movement is terminated when the lost motion between the pin 74 and an opening 98 in the lever 34 is taken up. The simultaneous movement of the power lever 34 and valve lever 72, pivoting about the end of the link 36 and the pin 74 respectively, serves to move the valve members 48 and 50 in opposite directions, the member 50 moving downwardly, Figures 4, 6 and 7, and the member 48 moving upwardly. There is thus effected a relatively fast opening or so-called cracking of the valve mechanism. With this operation, a land 100 on the spool-shaped valve member 50 moves past a port 102 in the valve member 48, and a recess 104 of the member 50 is brought into registry with said port. There is thus effected a fluid transmitting connection between the intake manifold, or other source of vacuum, and a lower compartment 106 of the motor 10 via port 102, recess 104, a duct 108 in the valve member 50 and the tube 52. An upper compartment 110 of the motor is at this time vented to the atmosphere via a port 112 in the valve member 48, a duct 114 in valve member 50, the hollow connecting rod 32, a port 116, and a duct 118 which may be connected to an air cleaner 120. Air is immediately withdrawn from the compartment 106, resulting in a differential of pressures acting on the piston 30. The piston is accordingly moved downwardly, the lever 34 rotating about the pin 74 and the link 36 being placed in compression to rotate the crank 26 counterclockwise. The low and reverse shift rail is thus moved toward its low gear position. In this operation, it will be noted that the valve member 48 reverses its direction of movement and accordingly moves in the same direction as the valve member 50, which is at the time being moved downwardly as described; for the driver, once he initiates the movement of the selector to place the transmission in low gear, usually continues the movement until the gears are in mesh.

Stressing now the most important feature of my invention, it will be noted that by virtue of the construction and arrangement of the valve operating mechanism as the selector is being moved toward its low gear position there results a relative movement between the valve parts 48 and 50, the valve part 48 moving to catch up with the valve part 50 and to progressively reduce the area of the port 102 in communication with the recess 104. The maximum area of this opening, resulting when the valve is first opened to move the piston 30 from its transmission neutral position disclosed in Figure 4, is limited, of course, by the geometry of the valve and its operating linkage, for example, by the size of the opening 98 in the power lever 34, the diameter of the pin 74 and the diameter of the port 102. Inasmuch as all lost motion is taken up when the valve is opened and thereafter during the movement of the selector, it follows that the levers 34 and 72 go solid, the port 102 and recess 104 registering to the maximum amount at first, the area of this opening progressively decreasing as the selector approaches its low gear position.

Explaining this operation, the relative movement between the valve members is effected by virtue of the fact that the distance between the pin 74 and the pin 38 is greater than the distance between the pin 88 and the pin 74. The pins 38 and 88 accordingly move in different arcs about the pin 74, resulting in the pin 38 moving faster than the pin 88 as the selector is moved to place the transmission in gear. The pin 88 is connected to the pin 92 by the link 90: accordingly, the pin 92 moves at substantially the same speed as the pin 88. Now, the valve members 48 and 50 are connected to the pins 38 and 88 respectively: accordingly, the member 48 moves faster than the member 50, resulting in the closing operation of the valve mechanism described above.

With such a mechanism in operation, the movement of the shift rail progressively slows up, that is decelerates, as it approaches its gear established position, this action taking place in both directions of movement of the rail from its neutral position. Such a mechanism reduces the likelihood of the piston 30 ramming the end of the casing 28 of the motor, and one of the important features of my invention is to so construct and arrange the above-described valve and valve operating mechanism as to effect a so-called lapping of the valve when the piston reaches a point just short of the end wall of the casing, the gears then being meshed. The motor 10 is then inoperative to further load the crank 26, thereby preventing the piston from ramming the end of the motor casing. By lapping is meant the movement of the land 100 to completely cover the port 102, and therefore stop the evacuation of air from the compartment 106 of the motor. This deceleration of the shift rail closely simulates the manual operation, by the driver, of the shift lever in the driver's compartment, for the driver usually slows up the movement of the shift lever as it approaches its final position, and particularly when the gear teeth abut each other in a transmission which is not provided with the so-called synchromesh mechanism. Should the transmission to be provided with the synchromesh mechanism of the day, the resistance to movement of the shift lever effected by such mechanism usually results in a slight slowing up of the shift lever.

With the power gear shift mechanism of my invention, the driver, in operating the selector 54, first moves the same to take up the lost motion between the pin 74 and the opening 98. This movement, as described in detail above, opens the valve, resulting in an energization of the motor 10. The movement of the selector and the valve operating lever 72 is uniform or substantially so: however, the piston 30 decelerates as referred to above. This deceleration results from the change in rate of efflux of air from the compartment 106 of the motor, for as the area of the opening between the port 102 and the land 100 decreases as above described, the rate of efflux of air also decreases. Accordingly, the gaseous pressure within the compartment 106 progressively decreases, resulting in a progressive decrease of the differential of pressures acting upon piston 30, or the force causing it to move. However, the construction and arrangement of the parts are such that the valve member 48 catches up with the valve 50 to lap the valve, despite the deceleration of the member 48. The deceleration factor of the piston and its connected shift rail is constant or substantially so, until the so-called blocker of the transmission synchronizer functions to increase the resistance to movement of the piston 30 and manually operated selector.

Now, when this resistance is met, the movement of the levers 34, 42 and 72 and of the crank 66, which move as a unit, may be momentarily stopped, or at least slowed down, depending, of course, on the operation of the synchronizer. This momentary checking of the valve operating linkage results in a greater evacuation of air from the compartment 106, assuming that low gear is being established; for during the movement of the piston downwardly, the gaseous pressure within the compartment 106 varies to effect the deceleration of the piston. However, when the movement of the piston is slowed down or possibly stopped, for example, when the synchronizer blocker functions as above described, then the continued evacuation of the compartment 106 results in a lowering of the gaseous pressure within said compartment. This results in a greater differential of pressures acting upon the piston 30 and a resultant increase of loading of the crank 26. After the mechanism of the synchronizer has functioned and the gears are about to be meshed, the piston and the levers 34, 32, 66 and 72 resume their movement to complete the meshing of the gears. As above described, however, the parts are so constructed and arranged that the valve is lapped, when the piston is just short of the end of the casing 28, to control the load to which the crank 26 is subjected by the power means and, what is more important, to prevent the piston 30 from ramming an end wall of the motor casing. Accordingly, the power means ceases to function just before the piston reaches the end of its stroke.

Describing the so-called follow-up action of the valve mechanism, should the movement of the selector 54 be stopped prior to reaching its low gear position, say, before the aforementioned blocker of the synchronizer mechanism is brought into play, the movement of the valve member 50, of course, will also be stopped. The piston 30 and its connected valve member 48, however, will continue to move until the land 100 completely covers the port 102, thus cutting off the source of vacuum from the compartment 106. In this movement the lever 34 moves about the pin 68 as a fulcrum. The piston 30 will then automatically stop, inasmuch as the system will be in equilibrium. The valve is now in its lapped position, the same position obtaining when the piston is at or near the end of the motor casing, all as described supra. The movement of the selector toward its gear establishing position will then be resumed. Simulating a manual operation of a shift lever, the piston and its connected shift rail stop whenever the driver for any reason stops the movement of the selector short of its gear established position.

Describing now the so-called feel during the operation of this mechanism, it will be noted that when the selector 54 is being moved toward its low gear position, the motor 10 then being energized and the valve member 48 moving toward the valve member 50, the floating power lever 34 is angularly moved clockwise about the pivot pin 74, the top of the opening 98 contacting said pin. During this movement, the transmission operating link 36 is placed in compression to move the crank 26 counterclockwise and the movement of the pin 38 under the load of the motor piston is resisted by the link 36 and the pin 68. In other words, the sum of the forces acting on the ends of the lever 34 equals the force or load from the motor piston acting between the ends of the lever at the pin 38. It follows therefore that the selector is subjected to a load resisting the movement thereof to open the valve, and this load is directly proportional to the gaseous pressure within the compartment 106, assuming the atmospheric pressure to be constant or substantially so. In other words, this reactionary load or feel increases when the piston 30 meets the resistance of the synchronizer mechanism to stop or slow up its movement, for at that time the gaseous pressure within the compartment 106 is decreased. It may also be noted that after all lost motion in the linkage is taken up, that is when the pin 74 contacts the lower portion of the opening 98 and all other lash is taken up, thereafter the force exerted by the piston, when serving to move the shift rail, may be supplemented by the physical effort of the driver, or, in the event of failure of the power means, the shift rails may be operated solely by the physical effort of the driver. To insure this operation there is provided a pin 76 secured to the lever 34 and extending through an opening 77 in the lever 72. This pin 76 reenforces the connection between said levers at pins 75 and 68, after the lost motion between the pin 76 and the lever 72 is taken up. As disclosed in Figure 7, the link 36 and the pins 68, 75 and 76 are surrounded by grummets, preferably of hard rubber. The opening 77 is, of course, sufficiently large to insure the necessary movement between the lever members 34 and 72 when the valve is first opened. It is to be noted, however, that the driver of the vehicle usually merely exerts enough force upon the selector to take up this lost motion and lash and then moves the same at a constant or substantially constant speed, until the blocker of the synchronizer mechanism functions to increase the resistance to movement of the motor piston and selector. After this resistance is encountered, the driver may and probably does supplement the load from the piston with his physical effort to complete the meshing of the gears.

The low gear establishing operation of the mechanism of my invention having been described in detail, it is believed unnecessary to describe in detail its operation in placing the transmission in the remaining gear ratios. Obviously, the operation of the motor 10 in placing the transmission in high gear is the same as that just described, and the operation of the motor to place the transmission either in reverse gear or in second gear is effected by merely reversing the direction of movement of the selector. It might be observed, however, that when effecting the second gear operation of the mechanism, after completing its low gear operation, the selector and consequently the piston 30 are moved to the transmission neutral position disclosed in Figures 1 and 4. The spring 78 then automatically functions to move the selector 54 clockwise in a plane perpendicular to the steering wheel 80, and subsequent counterclockwise movement of the selector in a plane parallel to the steering wheel, of course, effects the second gear establishing operation of the power means. A return spring 124 secured to the power lever 34 at 126 and coiled about the pin 68 serves to prevent undesired relative movement or rattling of the levers 34 and 72, the effect of which may be telegraphed back to the selector.

A curved spring member 128 is connected at its ends to pins 88 and 92 to provide means for holding the tube 52 and accordingly the valve member 50 in the desired position, when the selector is not being operated. Without such a spring, the force of gravity would move the valve member 50 relative to the member 48.

There is thus provided a compact power mechanism providing, in large measure, the force necessary to place the transmission in the desired gear ratio. In brief, the power mechanism of my invention provides a means for operating the transmission which is easily controlled, requires but little effort by the driver and simulates the operation of the shift lever of a conventional transmission.

While one illustrative embodiment has been described, it is not my intention to limit the scope of the invention to that particular embodiment, or otherwise than by the terms of the appended claims.

I claim:

1. A gear shifting mechanism comprising a plurality of shift rails, shift rail selecting means and means operable to move a selected rail to establish different gear relations, manually operated means for operating the shift rail selecting means and power means for actuating the means for moving a selected rail, said power means including a pressure differential operated motor and a two-part valve mechanism for controlling the flow of fluid into and from said motor to control the energization thereof, a manually operated valve operating selector member mounted adjacent the steering wheel of the vehicle, said member being movable in at least two different planes when being operated to control the operation of said valve mechanism and the aforementioned manually operable shift rail selecting means, and force transmitting means interconnecting said selector, two-part valve mechanism and rail moving means and serving, when actuated by the selector and the power element of the motor, to effect different rates of movement of the two parts of the valve mechanism, said force transmitting means including a crank, a valve operating power lever, a manually operated valve operating lever shorter than said valve operating power lever and movable relative thereto when the valve mechanism is being lapped, a pin interconnecting said crank and levers at one end thereof, means pivotally connected to the other end of said valve operating power lever and serving to connect said lever with one of the parts of said two-part valve mechanism, and other means pivotally connected to the other end of said manually operated valve operating lever and serving to connect said lever with the other part of said two-part valve mechanism.

2. A gear shifting mechanism comprising a plurality of shift rails, shift rail selecting means and means operable to move a selected rail to establish different gear relations, manually operated means for operating said shift rail selecting means and power means for actuating said means for moving a selected rail, said power means including a pressure differential operated motor and a two-part valve mechanism for controlling the flow of fluid into and from said motor to control the energization thereof, a manually operated valve operating selector member mounted adjacent the steering wheel of the vehicle, said member being movable in at least two different planes when being operated to control the operation of said valve mechanism and the aforementioned manually operable shift rail selecting means, and force transmitting means, including parts for moving the two parts of the valve mechanism at different rates in fixed ratio during the operation of the selector and the power element of the motor, interconnecting said selector, two-part valve mechanism and second mentioned means whereby the valve mechanism is placed in its lapped position to cut off the operation of the motor when the transmission is in gear.

3. A gear shifting mechanism comprising a plurality of shift rails, shift rail selecting means and means operable to move a selected rail to establish different gear relations, manually operated means for operating said shift rail selecting means and power means for actuating said means for moving a selected rail, said power means including a pressure differential operated motor and a two-part valve mechanism for controlling the flow of fluid into and from said motor to control the energization thereof, a manually operated valve operating selector member mounted adjacent the steering wheel of the vehicle, said member being movable in at least two different planes when being operated to control the operation of said valve mechanism and the aforementioned manually operable shift rail selecting means, and force transmitting means interconnecting said selector, two-part valve mechanism and second mentioned means, said force transmitting means, including a floating lever member connected to one of the two parts of the valve mechanism and another lever member of different effective length than said floating lever connected to the other part of the valve mechanism, said levers serving, when actuated by the selector and the power element of the motor, to effect different rates of movement of the two parts of the valve mechanism, whereby the valve mechanism is placed in its lapped position to cut off the operation of the motor when the transmission is in gear.

4. A gear shifting mechanism comprising a plurality of shift rails, shift rail selecting means and means operable to move a selected rail to establish different gear relations, manually operated means for operating said shift rail selecting means and power means for actuating said means for moving a selected rail, said power means including a pressure differential operated motor and a two-part valve mechanism for controlling the flow of fluid into and from said motor to control the energization thereof, a manually operated valve operating selector member mounted adjacent the steering wheel of the vehicle, said member being movable in at least two different planes when being operated to control the operation of said valve mechanism and the aforementioned manually operable shift rail selecting means, and force transmitting means, including a pair of lever members of different effective lengths independently connected to said valve parts and movable, by the selector and power element of the motor, at different rates in a fixed ratio whereby the valve mechanism is placed in its lapped position to cut off the operation of the motor when the transmission is in gear.

5. A gear shifting mechanism comprising a plurality of shift rails, shift rail selecting means and means operable to move a selected rail to establish different gear relations, manually operated means for operating said shift rail selecting means and power means for actuating said means for moving a selected rail, said power means including a pressure differential operated motor and a two-part valve mechanism for controlling the flow of fluid into and from said motor to control the energization thereof, a manually operated valve operating selector member mounted adjacent the steering wheel of the vehicle, said member being movable in at least two different planes when being operated to control the operation of said valve mechanism and the aforementioned manually operable shift rail selecting means, and force transmitting means interconnecting said selector, two-part valve mechanism and second mentioned means, said force transmitting means including means for effecting different rates of movement of the two parts of the valve mechanism and comprising a pair of lever members of different effective lengths, one of said members being connected to the selector member and to one of the parts of the two-part valve mechanism and the other lever member being connected to the selector member, the power element of the motor and the other part of the two-part valve mechanism whereby the valve mechanism is placed in its lapped position to cut off the operation of the motor when the transmission is in gear.

6. A gear shifting mechanism comprising a plurality of shift rails, shift rail selecting means and means operable to move a selected rail to establish different gear relations, manually operated means for operating the shift rail selecting means and power means for actuating the means for moving a selected rail, said power means including a pressure differential operated motor and a two-part valve mechanism for controlling the flow of fluid into and from said motor to control the energization thereof, a manually operated valve operating selector member mounted adjacent the steering wheel of the vehicle, said member being movable in at least two different planes when being operated to control the operation of said valve mechanism and the aforementioned manually operable shift rail selecting means, and force transmitting means interconnecting said selector, two-part valve mechanism, the power element of the motor and the rail moving means and serving, when actuated by the selector and the power element of the motor, to effect different rates of movement of the two parts of the valve mechanism, said force transmitting means including a floating valve operating power lever, a manually operated valve operating lever shorter than the valve operating power lever and movable relative thereto when the valve is being opened, together with a fixedly mounted pin constituting a fulcrum for one of said valve operating levers.

HAROLD W. PRICE.